Figures 1, 2:
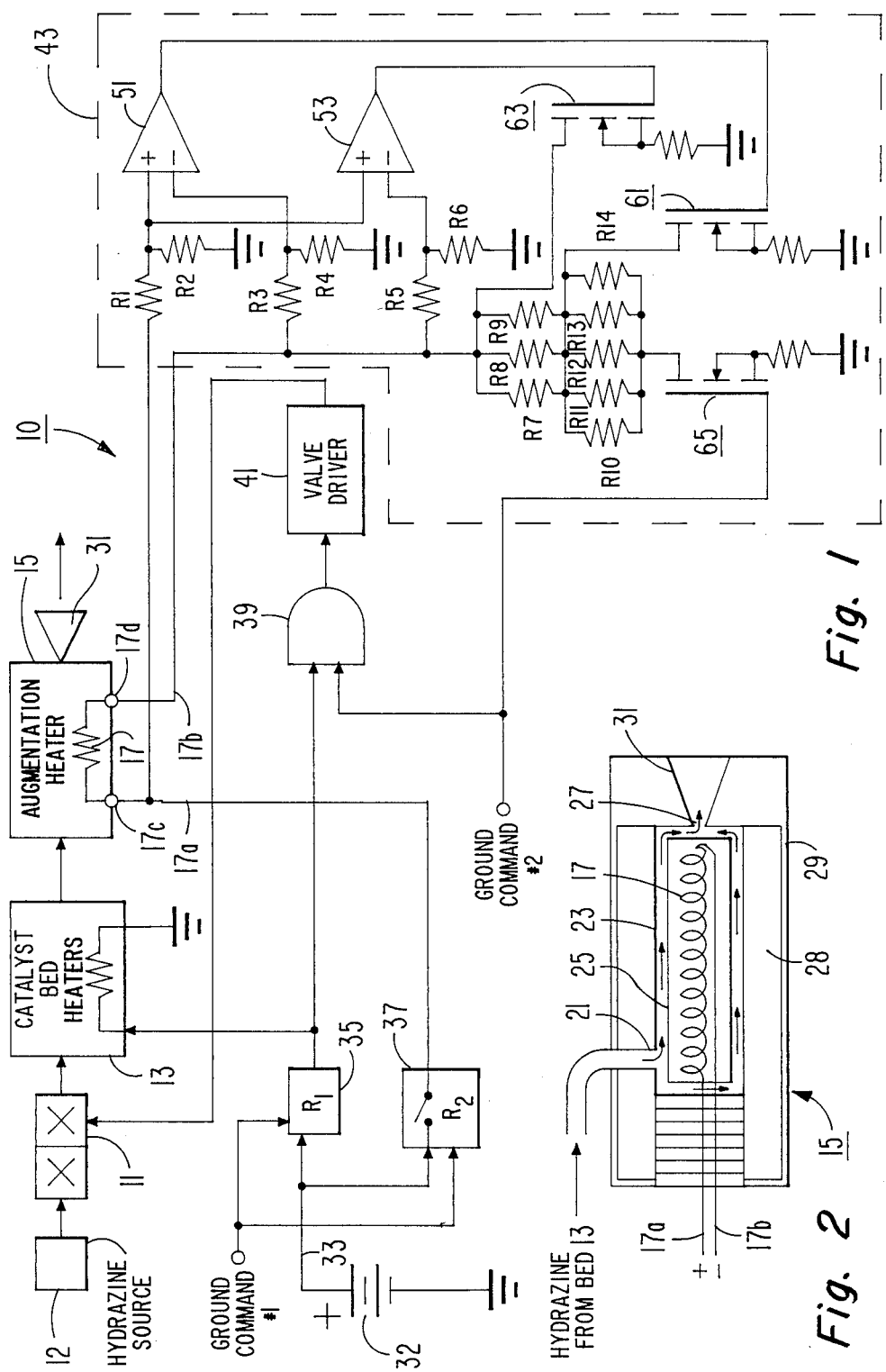

United States Patent [19]

Bingley

[11] Patent Number: 4,523,429
[45] Date of Patent: Jun. 18, 1985

[54] COLD START SURGE CURRENT LIMITING SYSTEM FOR A HYDRAZINE THRUSTER AUGMENTATION HEATER

[75] Inventor: John D. Bingley, Hatboro, Pa.

[73] Assignee: RCA Corporation, Princeton, N.J.

[21] Appl. No.: 481,384

[22] Filed: Apr. 1, 1983

[51] Int. Cl.³ ............................................... F02K 9/68
[52] U.S. Cl. .............................. 60/203.1; 60/39.462;
219/497; 219/505
[58] Field of Search .......................... 60/39.462, 203.1;
219/485, 497, 501, 505; 323/238, 321

[56] References Cited

U.S. PATENT DOCUMENTS

| | | | |
|---|---|---|---|
| 2,999,358 | 9/1961 | Zwick | 60/39.46 |
| 3,651,644 | 3/1972 | Breen et al. | 60/203 |
| 3,789,190 | 1/1974 | Orosy et al. | 219/497 |
| 3,956,885 | 5/1976 | Davis et al. | 60/203.1 |
| 4,288,982 | 9/1981 | Kuenzly et al. | 60/200 |
| 4,322,946 | 4/1982 | Murch et al. | 60/203.1 |

FOREIGN PATENT DOCUMENTS

| | | |
|---|---|---|
| 823631 | 4/1958 | United Kingdom . |
| 1589663 | 4/1976 | United Kingdom . |
| 1600707 | 5/1978 | United Kingdom . |

*Primary Examiner*—Louis J. Casaregola
*Attorney, Agent, or Firm*—Joseph S. Tripoli; Robert L. Troike

[57] ABSTRACT

An electrothermal hydrazine thruster passes the hydrazine through a catalyst bed and an augmentation heater. The augmentation heater includes an electrical heating element powered by a satellite battery. A load resistance is coupled in series with the heating element to reduce the current through the electrical circuit including the heating element to a safe level. A switch coupled across the load resistance is closed bypassing the load resistance when the heating element heats up and increases its resistance value to a value that can be tolerated in the battery circuit.

9 Claims, 2 Drawing Figures

COLD START SURGE CURRENT LIMITING SYSTEM FOR A HYDRAZINE THRUSTER AUGMENTATION HEATER

This invention relates to a cold start surge current limiting system for limiting the current through an augmentation heater of an electrothermal hydrazine thruster.

Geostationery satellites typically use thrusters to perform north-south station keeping. This north-south station keeping takes a large portion of the fuel (some 90% of the station keeping propellant) on the spacecraft in order to keep the satellite in its equatorial orbit. In order to improve the efficiency of these thrusters electrical augmentation heaters are used to increase the temperature of the hydrazine gas. These thrusters with their associated heaters are often referred to as electrothermal hydrazine thrusters (EHT). The augmentation heater includes a resistance element that is powered by a battery such as, for example, a 30 volt battery on a spacecraft. The heater resistance at cold temperature may only be, for example, about 0.2 ohm and when fully heated reaches a resistance of about 1.5 ohms. This low resistance at the cold start-up produces excessively high currents which can destroy the battery, the harness and the electronic switches and relays in the system. If one were to add a resistance in series to increase the overall resistance, this would greatly waste electrical power which is at a premium on a spacecraft.

In accordance with one embodiment of the present invention the augmentation heater element of an electrothermal hydrazine thruster has load resistance means coupled in series with the heater element and means for reducing this load resistance when, due to heat, the resistance of the heater element increases.

In the drawing:

FIG. 1 is a block diagram of electrothermal hydrazine thruster and control system in accordance with one embodiment of the present invention; and FIG. 2 is a sketch of the augmentation heater of FIG. 1.

Referring to FIG. 1 an electrothermal hydrazine thruster 10 as disclosed herein includes dual series propellant valves 11 for controlling the input hydrazine from source 12. Two valves are provided for redundancy. These valves are temperature controlled to assure operation. The output from valve 11 is applied through a catalyst bed 13. The catalyst bed 13 by chemical reaction heats up the hydrazine to a temperature of about 1400° Fahrenheit. Catalyst bed 13 includes redundant heaters which are used to preheat the catalyst bed before applying the hydrazine. The heaters prevent damage to the catalyst bed because of extreme changes in temperature. The hydrazine from the catalyst bed at about 1400° Fahrenheit is applied to an augmentation heater 15. This augmentation heater raises the hydrazine to a temperature of about 4,000° Fahrenheit before being expelled from nozzle 31.

Referring to FIG. 2 there is illustrated a sketch of the augmentation heater 15. The output from the catalyst bed 13 is piped into the augmentation heater through port 21 of cylindrical heater body 23. The augmentation heater 15 includes low valued heater resistor element 17 which may for example be a small diameter wire wound in a helix with one terminal end 17a to be connected to one battery terminal (positive for example) and the other terminal 17b coupled to ground or the other side of the battery. A conductive cylindrical cover 25 surrounds the heater resistor element 17 and is inserted coaxially in the body 23 so as to form a heat exchanger gap or passageway between body 23 and cover 25. The resistor element 17 is spaced from the conductive cylinder cover 25 by a rod and dielectric spacer mechanism for example (not shown). The whole assembly of resistor 17, cover 25 and body 23 is then covered by radiation shield material layer 28 and then by an outer heat shield 29. The body 23 has an exit port 27 at the remote end to which is coupled the nozzle 31. The hydrazine gas coupled in at port 21 passes between the cover 25 and the body 23 to exit port 27 at the base of the nozzle 31.

Referring to FIG. 1 the power to the heaters of the catalyst bed and the augmentation heater element 17 is provided for example by the battery bus 33 which is connected at one end for example to the positive terminal of battery 32. The opposite terminal end of the battery is connected to a reference potential such as, for example, ground. The bus 33 is connected to a small current handling relay 35 and a large current handling relay 37. The output of relay 35 is coupled to the heaters in catalyst bed 13 and to logic gate 39. The output from relay 37 is applied via lead 17a to one terminal 17c the augmentation heater element 17. The relays 35 and 37 are closed in response to a first command signal from a satellite ground station for example.

Control of the propellant valves 11 depends on a second command signal from a ground station for example. This second command signal is applied to and enables logic gate 39 to couple the bus 33 via relay 35 to valve driver 41. Valve driver 41 supplies sufficient current to operate the propellant valves 11.

According to the present invention, when this second command is received the cold start surge current limiting circuit 43 senses the resistance of augmentation heater resistor element 17 and appropriately switches first in and then out resistances to control the current through the heater element 17 as it heats up to protect the electrical system without excessive battery surge currents.

The second command signal is applied to power FET switch 65 coupling the opposite terminal 17d of heater element 17 via lead 17b and resistors R7 through R14 to ground for the example. Resistors R7, R8 and R9 are connected in parallel with each other to provide a low valued equivalent resistance and these resistors are connected in series with resistors R10, R11, R12, R13 and R14 which are also connected in parallel. The resistors R7, R8 and R9 form an equivalent resistance, for example of 0.34 ohms. The resistors R10 through R14 form an equivalent resistance, for example, of 0.648 ohms. Resistors R7, R8 and R9 are connected to lead 17b and resistors R10 through R14 are connected to one end of FET switch 65. Upon reception of the second command at the gate of switch 65 the gate closes, terminating the heater element to ground for the example through the resistors R7 through R14. Appropriate biasing of the FET switches is omitted. A second FET switch 61 is coupled between the series junction of the group of resistors R7, R8 and R9 and the group of resistors R10 through R14 and ground for the example. A third FET switch 63 is coupled across the resistors R7 through R14 to couple lead 17b directly to ground for the example.

The voltage at the junction of the heater element 17 and the load resistors R7 through R14 (at lead 17b) is compared to a reference voltage provided by resistors R1 and R2 which are coupled between lead 17a containing the battery voltage and ground or reference potential. This comparison senses the resistance of the heater element 17. The selected reference voltage developed between resistors R1 and R2 is coupled to one terminal (+ terminal for example) of each of comparators 51 and 53. A second input to comparator 51 is developed by the value of resistors R3 and R4 connected in series between lead 17b and the ground reference potential. The value of resistors R3 and R4 are selected such that when the voltage at lead 17b drops to about 23 volts this comparator 51 is switched to apply a sufficient positive voltage to the gate of power FET switch 61 to cause it to conduct and bypass resistors R10 through R14. The second input of comparator 53 is developed by voltage divider resistors R5 and R6 coupled to lead 17b. The values of these resistors R5 and R6 are selected such that when the lead 17b drops to the 17.2 volt level comparator 53 is switched to provide a sufficient positive bias to the gate of FET 63 to cause it to conduct and bypass resistors R7 through R14.

In accordance with the operation of the present invention a pair of commands are received at the satellite to control the thruster 10. These commands may come from a ground station via the telemetry system or they may be generated at the satellite under a program control. A first command received at the satellite energizes relay 35 and also energizes relay 37. Relay 35 in response to this first command provides current from the battery bus 33 to the heaters in catalyst bed 13. This command is applied at least 30 minutes before the second command to allow at least 30 minutes for the catalyst bed 13 to reach the required temperature to prevent damage. This first command signal and the closing of relay 35 also provides a first input to logic 39.

The second command is a fire thruster command that occurs at least 30 minutes after the first command and when received enables logic 39 to apply the battery bus to the valve driver 41 and provide appropriate current to temperature controlled valves 11 for opening the valves and coupling hydrazine to the catalyst bed 13. Also, this second command is applied to switch 65 in the slow start up control circuit 43 for completing the heater element circuit by coupling the other end 17d of heater element 17 through the resistors R7 through R14 to ground or the other end of the battery 32. As the heater element 17 heats up and increases its resistance from that of, for example, 0.2 ohms to approximately 0.67 ohms the full bank of resistors R7 through R14 remain in circuit to protect the battery and the relays and harnesses of the electrical system.

At, for example, approximately 0.67 ohm resistance level of the heater element 17 the voltage developed by the ratio of resistor dividers R3 and R4 is such as to change the state of comparator 51 and provide a biasing voltage to FET switch 61 which then conducts to provide a short or bypass across resistors R10 through R14. This then reduces the current loss through the system at a time in which the heater element 17 has raised the resistance value to tolerate this change in resistance.

When the heater element 17 value has reached about one ohm, the voltage developed by the ratio of resistors R5 and R6 is such as to cause comparator 53 to change state and provide bias to FET switch 63 to cause it to conduct and remove completely the resistances R7 through R14 and thereby provide essentially only the augmentation heater element 17 resistance in the circuit.

In practice FET switch 63 is made up of three parallel connected FET devices. For the above example system R1 is 10K ohms, R2 is 2.26K ohms, R3 is 10K ohms, R4 is 4.36K ohms, R5 is 5.11K ohms and R6 is 10K ohms.

Although the above described embodiment is believed the best mode at the present time and is a space proven or space qualified approach it is recognized that in an alternative embodiment of the invention the load resistor may be made of a material that decreases its resistance value in time to match the increased resistance of the augmentation heater element 17 to maintain for example a one ohm total resistance in series with the battery.

What is claimed is:

1. A cold start surge current limiter for a thruster heater resistance element coupled to a battery bus comprising:
    load resistance means coupled in series with said battery bus and said heater resistance element to limit the current through said heater resistance element at the start of said thruster; and
    means responsive to the resistance of said heater element for bypassing said load resistance means to decrease the loss when the heater element heats up to alone provide a safe current level.

2. The combination of claim 1 wherein said bypassing means is coupled across said resistance means.

3. The combination of claim 1 wherein said load resistance means includes at least first and second series connected load resistances and said bypassing means includes first bypassing means coupled across both first and second series connected load resistances responsive to a predetermined safe level of sensed resistance of said heater element for bypassing said first and second series connected load resistances.

4. The combination of claim 3 wherein said bypassing means includes a second bypassing means connected only across the second of said series connected load resistances and responsive to the resistance value of the heater element at between a cold resistance level and said safe level for bypassing only said second series load resistance.

5. The combination of claim 1 wherein said bypassing means includes sensing means for sensing the resistance of said heating element and switch means coupled across said resistance means responsive to a predetermined sensed resistance value of said heating element for triggering said switch means to bypass said resistance means.

6. The combination of claim 5 wherein said sensing means includes a comparator.

7. The combination of claim 5 wherein said load resistance means includes first and second series connected load resistances, said sensing means includes first and second comparators and a pair of series connected voltage dividing resistors connected in parallel across said heater element and said load resistance means with the junction point of said voltage dividing resistors connected to one input of said first and second comparators to provide a reference voltage, and said switch means includes a first switch responsive to a first control signal for bypassing said first and second series connected load resistance and a second switch responsive to a second control signal for bypassing only said second series connected resistance.

8. The combination of claim 7 wherein said sensing means further includes a second and a third pair of voltage divider resistors of different divider ratios, each of said second and third pair of voltage divider resistors being coupled in series with said heater element and across said load resistance means to sense a parameter related to the resistance value of said heater element, the junction of said second pair of voltage divider resistors being coupled to the other input of said first comparator, and the junction of said third pair of voltage divider resistors being coupled to the other input of said second comparator, said first comparator coupled to said first switch for providing said first control signal when said sensed resistance value of said heater element is at a first safe level and said second comparator coupled to said second switch for providing said second control signal when said sensed resistance value of said heater element is at a second safe level with only said first series connected load resistance.

9. In an electrothermal hydrazine thruster including a catalyst bed for chemically heating hydrazine passed therethrough and an augmentation heater that further heats up the hydrazine before applying to an exhaust nozzle, said augmentation heater including a heater resistance element coupled upon thruster command in series with a battery, a battery bus and relays, said heater element initially being at such a low resistance value in its cold state to damage the battery, the battery bus and the relays, said heater element increasing in resistance value as it heats up, the improvement comprising:
- a load resistance coupled in series with said heater element to decrease the current level in the heater element circuit and thereby prevent damage to the battery, battery bus and the relays; and
- means coupled across said load resistance responsive to a given resistance value of said heater element for bypassing said load resistance when said heater element has reached a predetermined temperature as measured by its resistance.

* * * * *